United States Patent Office 3,546,059
Patented Dec. 8, 1970

3,546,059
COMPOSITE FIBROUS ARTICLE BONDED WITH NOVEL COPOLYMER COMPOSITIONS AND METHOD OF MAKING SAME
Irving E. Isgur, Framingham, and John L. Ohlson, Bedford, Mass., assignors to W. R. Grace & Co., Cambridge, Mass., a corporation of Connecticut
No Drawing. Continuation-in-part of application Ser. No. 680,003, Nov. 2, 1967, now Patent No. 3,472,808, which is a continuation-in-part of application Ser. No. 587,657, Oct. 19, 1966, which in turn is a continuation-in-part of application Ser. No. 364,752, May 4, 1964. This application Oct. 9, 1969, Ser. No. 865,196
Int. Cl. B32b 5/06
U.S. Cl. 161—81                12 Claims

ABSTRACT OF THE DISCLOSURE

Composite fibrous articles are disclosed having a surface filamentary layer (e.g. polypropylene) extending through a base fabric layer (e.g. a woven polypropylene scrim), the portions of the filaments extending through the base fabric being bonded to the base fabric by a copolymer containing (1) a conjugated diene, (2) styrene and/or acrylonitrile, (3) vinylidene chloride and (4) a functional monomer, which can be acrylamide, methacrylamide, octyl acid maleate or a monoethylenically unsaturated mono- or dicarboxylic acid (e.g. acrylic or itaconic acid).

---

This application is a continuation-in-part of application Ser. No. 680,003 filed Nov. 2, 1967 and now Pat. No. 3,472,808, which is a continuation-in-part of application Ser. No. 587,657 filed Oct. 19, 1966, now abandoned, which is a continuation-in-part of application Ser. No. 364,752 filed May 4, 1964, now abandoned.

This invention relates to improved composite fibrous materials, and, more particularly, to such materials bonded with a novel copolymeric binder composition possessing certain desirable characteristics.

In the present invention, composite fibrous materials of the type wherein a soft, resilient surface layer of natural or synthetic fibers are locked within a base fabric or scrim by a binder or "backing," are improved by the use of novel copolymeric compositions as binders. The binder compositions employed herein exhibit good bonding strength and good aging and color stability properties. The compositions also desirably impart a degree of flame proofness to the fibrous material since the compositions themselves are flame proof. This desirable property renders the binder compositions especially suitable for use in fibrous composites, particularly low density fibrous composites, produced from fibers which are also to a degree flame proof such as polypropylene. Flame proofness of a material as intended herein is the property whereby combustion of the material nearly instantaneously ceases upon the removal or extinguishing of a source of flame in contact with the material.

The novel binder composition employed in the present invention is formed by copolymerizing the following monomers: (1) a conjugated diene, for example of 4 to about 9 carbon atoms, such as butadiene or isoprene, (2) at least one monomer of the formula $$CH_2=CH$$
$$\phantom{CH_2=}|$$
$$\phantom{CH_2=}R$$

wherein R is a phenyl or cyano group, e.g., styrene or acrylonitrile (3) vinylidene chloride and (4) functional monomer comprising one of the group of acrylamide, methacrylamide, octyl acid maleate and monoethylenically unsaturated monocarboxylic and dicarboxylic acids of 3 to about 12, preferably 3 to about 5 carbon atoms, e.g., acrylic acid, cinnamic acid, methacrylic acid, crotonic acid, itaconic acid, maleic acid, fumaric acid, etc. The preferred mono- and dicarboxylic acid functional monomers used in the composition of the convention are acrylic acid, methacrylic acid and itaconic acid. Further, the mono- or dicarboxylic acids may contain non-deleterious substituents, for example, halogen which do not adversely affect copolymerization of the acid monomer. The term functional monomers as used herein is intended to refer to the reactivity or interaction of the functional group of the monomer with the fibers and not the relative reactiviy of the monomers themselves to addition polymerization. The use of the functional monomer improves the bonding of the fibers of the composite material.

Optional additional components that may be used in the binder composition, for example, in an amount of up to about 5 wt. percent, such as antioxidants, defoamers and surface tension control agents are conventional and generally desirable.

The ratio of the above components of the binder composition may vary over a relatively wide range. Generally, the ratios of the components are approximately as follows:

Conjugated diene—25 to 70 percent, preferably 40 to 65 percent;

$CH_2=CH$ monomer—5 to 70 percent, preferably 5 to 30 percent

Vinylidene chloride—5 to 50 percent, preferably 20 to 40 percent;

Functional monomer—0.5 to 15 percent, preferably 1 to 4 percent.

The copolymers can be prepared using conventional emulsion polymerization techniques but are preferably prepared by the emulsion polymerization process described in U.S. Pat. No. 3,397,165. This process comprises the steps of initially charging a reactor with a relatively small quantity of polymer latex as a seed to provide the nucleating sites for polymerization and adding, substantially continuously, monomers and emulsifier at a controlled rate. The seed provides the only source of nucleating sites in the reaction. The rate of monomer addition is such that the added monomer becomes associated with the polymer particles in the reactor as soon as the monomer enters the reaction zone and a separate monomer phase is not formed. The rate of emulsifier addition is proportional to the rate of growth of particle surface area. The emulsifier is added at a rate such that only about 30 to 70 percent of the surface area of the particle is covered with emulsifier.

Composite, bonded fibrous materials such as are described above, are used in textile applications and particularly as "soft" floor and upholstery coverings. The soft, resilient, fibrous surface layer may be a pile formed by needle tufting the fibers through the interstices of the base fabric or scrim in the conventional manner or may be a web or bat of disoriented, loosely arranged fibers formed by any of the well known methods, e.g., garnetting carding, cross-lapping, which, following deposition of the web or bat upon the base fabric, is punched a number of times using barbed needles so that some of the fibers in the web extend through the base fabric. The legs or base segments of the fibers extending through the base fabric as a result of either the tufting or the needle punching technique are then bonded to the base fabric by the application of the binder. The surface fibers may be multi- or monofilaments prepared from animal or vegetable fibers, for example, wool hair, cotton, flax, sisal, hemp and other naturally occurring cellulosic or proteinaceous fibers or synthetic fibers, such as polyolefin, rayon, viscose or acetate, nylon, polyester, acrylics, etc., or mixtures thereof. The base fabric or scrim is typically a loosely woven web of inexpensive fiber such as jute or hemp but can be made from any of the aforementioned fibers. The binder is often applied by spraying or roller coating, the amount of binder applied varying with the specific construction of the composite material and the type of fibers used. The binder is generally not applied to the extent that it penetrates beyond the base fabric. The amount of binder material applied per square yard of the composite material usually ranges between 5 and 15 ounces. The latex binder is then dried, for example, at a temperature of about 250° to 300° F. An additional backing layer, for example, a layer of foam rubber, etc., can be adhered to the binder-coated base fabric.

The following nonlimiting Examples 1–6 illustrate the preparation of the binder compositions of the present invention.

EXAMPLE 1

Into a polymerization vessel were placed 6.75 parts of a 60:40 styrene; butadiene copolymer "seed" latex containing 2.7 parts solids and having an average particle size of 600 A. To the above was added with agitation 0.227 part sodium pyrophosphate, 0.061 part sodium dodecyl benzene sulfonate, and 44.60 parts of water. The reactor was then purged with nitrogen for 30 minutes. The temperature of the reaction mixture was raised to 170° F., and this temperature was maintained throughout the reaction. A solution of 1.009 parts of potassium persulfate in 23.780 parts of water was then added to the reactor. The continuous addition of a mixture of 8.3 parts of styrene, 50.0 parts of butadiene, 40.0 parts vinylidene chloride, 1.7 parts methacrylic acid, and 0.1 parts dodecyl mercaptan was begun at the rate of 16.667 parts per hour. After the monomer addition had begun, the continuous addition of an emulsifier solution of 1.356 parts of sodium dodecyl benzene sulfonate and 0.663 parts of sodium oleoyl isopropenol amide sulfosuccinate in 28.96 parts of water was begun. The emulsifier solution was added at a nonlinear rate according to the schedule set forth below.

| Elapsed reaction time (hours): | Percent of added emulsifier |
| --- | --- |
| 1 | 11.1 |
| 2 | 33.4 |
| 3 | 50.8 |
| 4 | 66.0 |
| 5 | 80.0 |
| 6 | 92.5 |
| 7 | 100.0 |

The reaction mixture was maintained at 170° F. for 1⅔ hours after the completion of the monomer addition. The maximum pressure in the reactor was 70 p.s.i.g. The reaction went to 86 percent conversion.

EXAMPLE 2

The procedure of Example 1 was carried out using the same seed and emulsifier with the following monomeric mixture:

| | Parts |
| --- | --- |
| Styrene | 41.67 |
| Butadiene | 50.00 |
| Vinylidene chloride | 6.66 |
| Methacrylic acid | 1.67 |

The reaction went to 96.6 percent conversion and a total solids content of 48.3 percent. The product had an average particle size of 1950 A, ±200 A, and a surface tension of 52 dynes/cm.

EXAMPLE 3

The procedure described in Example 1 was carried out using the same seed and emulsifier with the following monomeric mixture:

| | Parts |
| --- | --- |
| Styrene | 1.6 |
| Butadiene | 65.4 |
| Acrylonitrile | 26.0 |
| Vinylidene chloride | 5.0 |
| Acrylic acid | 2.0 |

EXAMPLE 4

The procedure described in Example 1 is carried out using the same seed and emulsifier with the following monomeric material:

| | Parts |
| --- | --- |
| Styrene | 18 |
| Butadiene | 42 |
| Vinylidene chloride | 40 |
| Itaconic acid | 3.4 |

EXAMPLE 5

A composition is prepared as in Example 4 substituting acrylamide for itaconic acid.

EXAMPLE 6

A latex composition is prepared as in Example 1 using the following monomeric material:

| | Parts |
| --- | --- |
| Styrene | 16.3 |
| Butadiene | 42 |
| Vinylidene chloride | 40 |
| Methacrylic acid | 1.7 |

EXAMPLE 7

A composite material was made by double needle punching a web of short length, garnetted polypropylene fibers through a woven polypropylene scrim. Two 12 inch by 12 inch samples were cut from the material. A latex as prepared in Example 6 was applied by spray gun to the scrim side of one of the samples. For comparison, a latex prepared as in Example 6 except that an additional 40 parts of styrene comonomer was used in place of the 40 parts of vinylidene chloride was applied to the scrim side of the other sample. In both cases, the amount of the latex applied was approximately 9 ounces per square yard of the needle punched material. After spraying, the material was squeezed between rollers to insure proper penetration, i.e., to approximately the depth of the scrim or about 50% of the width of the material. The samples were then dried in an oven maintained at a temperature of 270° F. for 10 minutes. Each of the samples was then heated for 20 minutes in an oven at 158° F. and tested for flammability immediately by placing each of the samples in a box approximately 20 inches square and 10 to 12 inches high. A methenamine timed burning pill (0.15 g. hexamethylene tetramine, 3/16 x ⅛ inch) is placed in the center of each sample of bonded material and lighted. Each pill is allowed to burn out. The sample bonded by a latex of the invention (Example 6) stopped burning when the pill stopped burning in 1 minute and 50 seconds. After two minutes the other sample continued to burn and had to be extinguished.

We claim:

1. A composite fibrous article comprising a surface filamentary layer having a plurality of base portions extending through and bonded to a base fabric, said bonding being accomplished by a copolymer composition consisting essentially of the following copolymerized monomeric constituents; (a) 25 to 70 percent by weight of a conjugated diene of 4 to about 9 carbon atoms, (b) 5 to 70 percent by weight of at least one monomer of the formula

wherein R is selected from the group consisting of phenyl and cyano radicals, (c) 5 to 50 percent by weight of vinylidene chloride, and (d) 0.5 to 15 percent by weight of a functional monomer selected from the group consisting of acrylamide, methacrylamide, octyl acid maleate and monoethylenically unsaturated monocarboxylic and dicarboxylic acids of 3 to about 12 carbon atoms.

2. The article of claim 1 wherein said diene is butadiene.

3. The article of claim 1 wherein said filamentary layer comprises a layer of polypropylene fibers.

4. The article of claim 1 wherein said base fabric is a woven polypropylene scrim.

5. A composite fibrous article having as a surface layer a web of disoriented synthetic fibers, said fibers having base portions, which extend through a loosely woven base fabric, said base portions being bonded to said fabric by a copolymer composition consisting essentially of the following copolymerized monomeric constituents: (a) 25 to 70 percent by weight of butadiene, (b) 5 to 70 percent by weight of at least one monomer of the formula

wherein R is selected from the group consisting of phenyl and cyano radicals, (c) 5 to 50 percent by weight of vinylidene chloride, and (d) 0.5 to 15 percent by weight of a functional monomer selected from the group consisting of acrylamide, acrylic acid, methacrylic acid and itaconic acid.

6. The composition of claim 5 wherein said monomer of the formula

is styrene.

7. The method of producing a composite fibrous article which comprises forming a surface filamentary layer having base portions on a base fabric, extending the base portions through said base fabric, applying an aqueous copolymer latex to the base portions which extend through said fabric, said copolymer latex consisting essentially of the following copolymerized monomeric constituents: (a) 25 to 70 percent by weight of a conjugated diene of 4 to about 9 carbon atoms, (b) 5 to 70 percent by weight of at least one monomer of the formula

wherein R is selected from the group consisting of phenyl and cyano radicals, (c) 5 to 50 percent by weight of vinylidene chloride, and (d) 0.5 to 15 percent by weight of a functional monomer selected from the group consisting of acrylamide, methacrylamide, octyl acid maleate and monoethylenically unsaturated monocarboxylic and dicarboxylic acids of 3 to about 12 carbon atoms, and thereafter drying the said latex to bond said base portions to said base fabric.

8. The method of claim 7 wherein said diene is butadiene.

9. The method of claim 7 wherein said filamentary layer comprises a layer of polypropylene fibers.

10. The method which comprises depositing a web of disoriented synthetic fibers on a base fabric, needle punching said web through said base fabric such that at least some of the base portions of the synthetic fibers extend through said base fabric, bonding said base portions to said fabric by applying thereto an aqueous copolymer latex consisting essentially of the following copolymerized monomeric constituents: (a) 25 to 70 percent by weight of butadiene, (b) 5 to 70 percent by weight of at least one monomer of the formula

wherein R is selected from the group consisting of phenyl and cyano radicals, (c) 5 to 50 percent by weight of vinylidene chloride, and (d) 0.5 to 15 percent by weight of a functional monomer selected from the group consisting of acrylamide, acrylic acid, methacrylic acid and itaconic acid, and thereafter drying said latex.

11. The method of claim 10 wherein said monomer of the formula

is styrene.

12. The method of claim 10 wherein said synthetic fibers are polypropylene fibers and said base fabric is a woven polypropylene scrim.

References Cited

UNITED STATES PATENTS

| | | | |
|---|---|---|---|
| 2,698,318 | 12/1954 | Brown | 260—80.7 |
| 2,724,707 | 11/1955 | Brown | 260—80.7 |
| 2,908,013 | 10/1959 | Keen et al. | 161—66X |
| 3,060,072 | 10/1962 | Parlin et al. | 161—81X |
| 3,075,867 | 1/1963 | Cochran | 161—66X |
| 3,238,595 | 3/1966 | Schwartz et al. | 28—74 |
| 3,348,992 | 10/1967 | Cochran | 161—67X |
| 3,348,993 | 10/1967 | Sissons | 161—81X |

FOREIGN PATENTS

| | | |
|---|---|---|
| 862,372 | 3/1961 | Great Britain. |

ROBERT F. BURNETT, Primary Examiner

R. L. MAY, Assistant Examiner

U.S. Cl. X.R.

156—148, 331, 332; 161—66, 403